United States Patent [19]

Taccone

[11] 3,840,066

[45] Oct. 8, 1974

[54] CONVEYOR FOR A FLASKLESS MOLD LINE

[76] Inventor: Russell William Taccone, 1960 Lakeside Dr., Erie, Pa. 16511

[22] Filed: Dec. 29, 1972

[21] Appl. No.: 319,803

[52] U.S. Cl. .............................................. 164/323
[51] Int. Cl. ............................................. B22c 9/20
[58] Field of Search ....... 164/37, 40, 130, 167, 168, 164/329, 330, 323, 324; 198/29, 31, 34, 97, 101

[56] References Cited
UNITED STATES PATENTS

| | | | |
|---|---|---|---|
| 2,678,151 | 5/1954 | Geisler | 198/31 R X |
| 3,529,711 | 9/1970 | Moeller | 198/34 |
| 3,540,516 | 11/1970 | Taccone | 164/130 X |

FOREIGN PATENTS OR APPLICATIONS

| | | | |
|---|---|---|---|
| 1,211,605 | 10/1959 | France | 164/130 |
| 1,608,040 | 9/1970 | Germany | 164/40 |

*Primary Examiner*—J. Spencer Overholser
*Assistant Examiner*—John E. Roethel

[57] ABSTRACT

The conveyor includes a pouring line forming a part of a fixed conveyor. A plurality of cooling conveyor sections are movable laterally relative to and for selective longitudinal registry with the fixed conveyor. The discharge end of the fixed conveyor and the inlet ends of the movable conveyors each carry gates including frames mounting vertically reciprocable blades. When the fixed conveyor and a movable conveyor section in line with the fixed conveyor are filled with molds and castings, the blades of the gates register one with the other and are driven downwardly to shear through an empty mold. The mold filled cooling conveyor section is then moved laterally and another section brought into registry with the fixed conveyor and the cycle is repeated.

6 Claims, 2 Drawing Figures

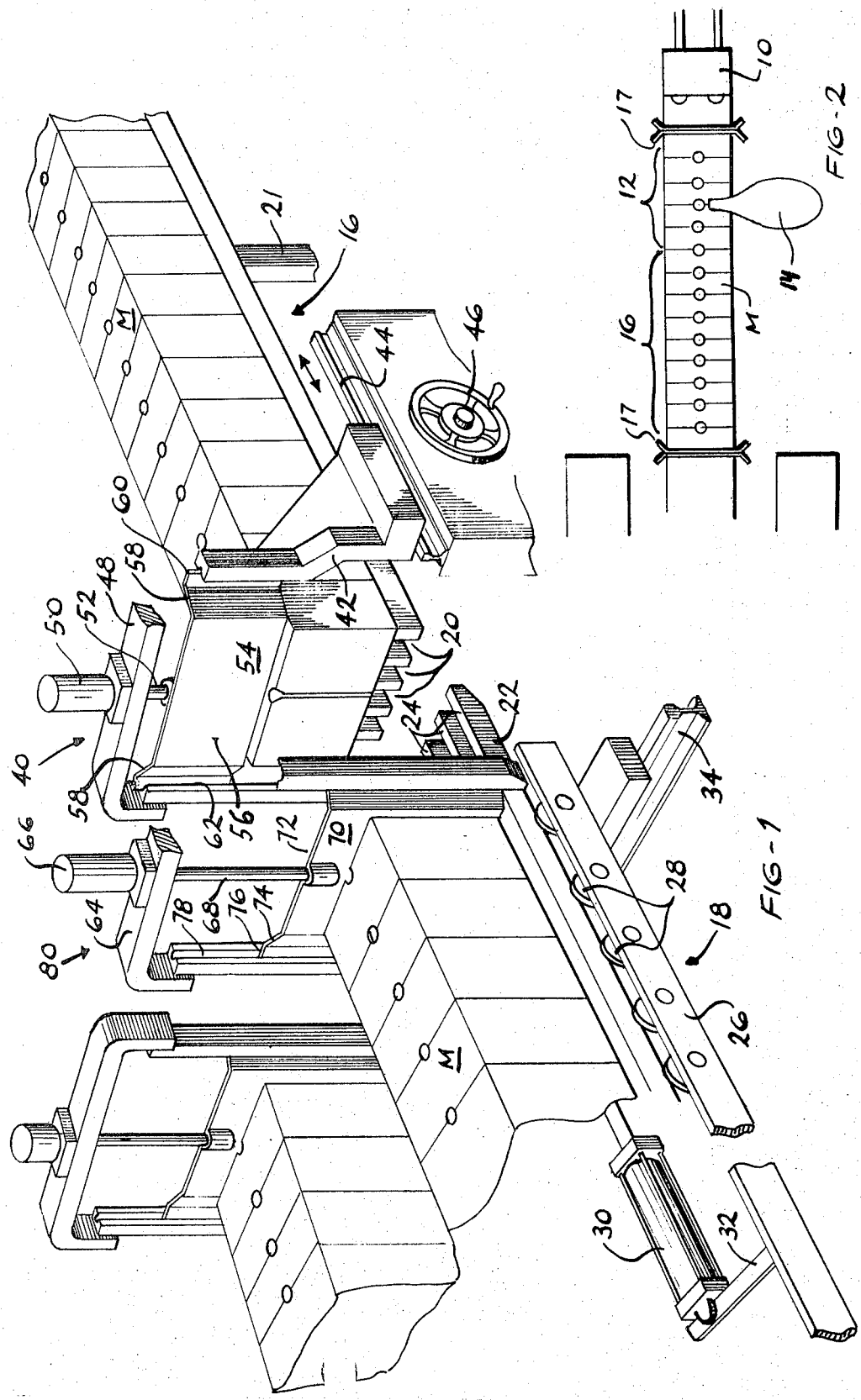

CONVEYOR FOR A FLASKLESS MOLD LINE

The present invention relates to a cooling line for castings and particularly relates to a cooling line having a plurality of moving conveyor sections selectively alignable with a fixed conveyor section for receiving the castings together with apparatus for separating the fixed and moving conveyor sections without compromising mold integrity or otherwise damaging the castings in the cooling line.

In flaskless molding operations, a molding machine is normally utilized to form a complete mold each operating cycle. Two successively formed molds provide a molding cavity at their interface. Molten metal is poured into the cavity to form the casting. Customarily, the molds are maintained in face-to-face alignment upon discharge from the molding machine until the mold is dropped from a cooling conveyor into a shakeout trough for breaking the castings from the molds. It will be appreciated that the push-out operation from the mold forming machine also serves to convey the entire line of molds and their castings along the pouring platform and cooling conveyor to the shakeout conveyor. After the metal is poured, the mold must be cooled to avoid premature exposure of the solidifying metal to the atmosphere which would otherwise result in a defective casting. A minimum residence time for the casting in the mold is thus required. Obviously, the timing of the mold forming and casting operations and length of the cooling conveyor may be such that by the time the molds reach the shakeout conveyor, the castings are sufficiently cooled for break-out from the molds. This, however, requires a long line of molds which, in turn, subjects each newly formed mold to substantial compressive forces which very often crack or otherwise compromise the integrity and dimensional accuracy of the newly formed mold.

Apparatus has been developed for substantially reducing the force imposed on the newly formed molds as they are pushed out from the flask onto the pouring platform and along the cooling conveyor. Such apparatus includes a pouring platform comprising a conveying surface defined by a number of parallel rails over which the sand molds slide. The mold from the molding machine slides onto the pouring platform, receives a charge of molten metal, and is pushed forwardly along the conveying surface by subsequently formed molds pushed out from the molding machine. A separate conveyor cooling section is utilized with this fixed conveyor cooling line and includes a conveying surface comprised of spaced rails which interfit and telescope with respect to the rails of the fixed conveyor section. The rails, under the operation of a power cylinder, reciprocate longitudinally on rollers such that the casting discharged from the fixed conveyor onto the movable conveyor causes the movable conveyor to roll longitudinally in a downstream direction a distance approximating a mold length. Before the next mold is pushed out from the molding machine, the rails of the movable conveyor are moved toward the fixed conveyor without imposing substantial forces on the newly formed molds while simultaneously maintaining alignment of the molds in face-to-face contact.

The present invention constitutes an improvement in the foregoing described arrangement in that it provides for a plurality of cooling conveyor sections selectively movable into longitudinal registry with the fixed conveyor for receiving the molds and castings and movable out of registry therewith into cooling areas to one side of the main cooling line whereby the required residence time of the castings in the molds is obtained. Particularly, the present invention relates to apparatus for dividing the main cooling line comprised of the fixed and movable sections at a predetermined mold in the line whereby the movable cooling section can be displaced to a storage or cooling area and an empty cooling section moved into registry with the fixed conveyor line to receive additional molds and castings. It will be appreciated that in dividing the main cooling line, it is essential that mold integrity and dimensional accuracy be maintained. To accomplish the foregoing, a plurality of longitudinally extending movable conveyor sections are mounted on rails for movement in a lateral direction into and out of longitudinal registry with the fixed conveyor. Each movable conveyor section includes a longitudinally reciprocable conveying surface comprised of a plurality of laterally spaced rails which telescope and interfit with the laterally spaced rails of the fixed conveyor section similarly as previously described. The discharge end of the fixed conveyor and each of the inlet ends of the moving conveyor sections are provided with gates for separating the mold line and retaining the molds on the respective conveyors in face-to-face alignment one with the other. Each gate includes side frame members mounting a vertically reciprocable blade under control of a power cylinder. The opposed faces of the blade at the discharge end of the fixed conveyor section and each of the blades at the inlet ends of the moving conveyor sections have corresponding contours whereby the blade faces conform one with the other when in longitudinal butting registry. The gate at the discharge end of the fixed conveyor is longitudinally movable such that its blade can be aligned over a mold interface defining a mold cavity which has not been poured.

In use, a movable conveyor section is aligned in longitudinal registry with the fixed conveyor section and molds are discharged from the latter onto the former in the manner previously described. When the movable conveyor section is substantially filled with castings, a mold retainer plate is applied at the end of the movable conveyor remote from the fixed conveyor. The gate at the discharge end of the fixed conveyor section is then displaced longitudinally to align it with a mold interface at an unpoured cavity. The movable conveyor section is then moved longitudinally on its rollers to bring the blade of its gate into contact with the blade of the fixed gate. The blades are lowered and shear through the empty mold cavity. This shearing action divides the mold line into two sections, one on the movable conveyor and the other on the fixed conveyor. The movable conveyor is then moved longitudinally away from the fixed conveyor to disengage the gates and then laterally to a storage or cooling area. Another cooling section is then moved laterally into longitudinal alignment with the fixed conveyor section and the blade of the fixed gate is raised whereupon additional molds are discharged onto the movable conveyor and the cycle is repeated.

It is a significant feature of the present invention that the molds at all times are maintained in butting face-to-face relation one with the other, the retainer plate and blade at opposite ends of the movable conveyor section and the blade carried by the fixed conveyor section serving this purpose. This maintains the integrity and dimensional accuracy of the mold cavities throughout the cooling process. When sufficient residence time has passed, the molds on the movable conveyors can be discharged onto a shakeout conveyor and the castings broken out.

Accordingly, it is a primary object of the present invention to provide a novel and improved cooling conveyor for poured molds.

It is another object of the present invention to provide a novel and improved cooling conveyor for molds wherein the cooling line can be readily and easily separated to define a plurality of cooling conveyor sections.

It is still another object of the present invention to provide a cooling conveyor for poured flaskless molds wherein the mold line can be separated without damaging the castings or otherwise disturbing or compromising the integrity and dimensional accuracy of the molds.

It is a further object of the present invention to provide a novel and improved cooling conveyor for castings in flaskless molds wherein the mold line can be readily and easily separated without significant interruption of the casting process.

These and further objects and advantages of the present invention will become more apparent upon reference to the following specification, claims and appended drawings wherein:

FIG. 1 is a fragmentary perspective view with parts broken out for clarity of a cooling conveyor line for flaskless molding constructed in accordance with the present invention; and FIG. 2 is a reduced fragmentary plan view schematically illustrating the relation between the mold forming machine, the pouring station and the cooling conveyor.

Referring now to the drawings, particularly to FIG. 2, there is schematically illustrated at 10 the pushout portion of a mold forming machine which serves to deposit molds M formed by the machine onto a pouring platform 12. A ladle 14 is provided for pouring metal into the mold cavities which are defined between the opposed butting faces of adjacent molds M. Conventionally, the castings are conveyed along the pouring platform 12 and a fixed cooling conveyor section, designated 16, by pushout 10. Pushout 10 steps the molds M along platform 12 and conveyor section 16 a distance equal to a mold length each time the molding machine deposits a newly formed mold on platform 12. In FIG. 2, the molds on platform 12 and conveyor section 16 are illustrated as confined between end retainer plates 17. Rather than using the mold pushout 10, the molds can be disposed on a movable conveyor section for storage whereupon pouring can be accomplished at a later time.

Referring to FIG. 1, the discharge end of the fixed cooling conveyor 16 is illustrated in longitudinal registry with one of a plurality of moving conveyor sections, generally indicated 18. The conveyor section 16 includes a plurality of longitudinally extending laterally spaced rails 20 which define a conveyor surface for the molds M. The rails 20 are mounted on suitable cross-beams, not shown, supported by uprights 21. Each conveyor section 18 comprises a longitudinally reciprocable conveyor surface 22 comprised of a plurality of longitudinally extending laterally spaced rails 24. Rails 24 define a conveyor surface for the molds M on the moving conveyor sections 18. Suitable cross-beams, not shown, are disposed below and connect between the rails 24. Each moving conveyor section 18 includes a frame 26 mounting a plurality of longitudinally spaced rollers 28 on which the conveyor surface 22 is mounted for longitudinal reciprocating movement. A suitable fluid actuated cylinder 30 connects between a cross-beam 32 carried on the frame 26 and the cross-beam, not shown, which lies below and connects rails 24 whereby conveyor surface 22 can be selectively extended or retracted. Frame 26, in turn, is mounted at opposite ends on a pair of laterally extending rails, one of which is illustrated at 34. Suitable manual or power actuated means, now shown, may be provided to displace the movable carriage sections 18 along rails 34 into and out of longitudinal registry with the fixed conveyor section 16.

A gate, generally indicated 40, is disposed at the discharge end of the fixed conveyor section 16. Gate 40 includes a pair of upstanding supports 42 which straddle the discharge end of conveyor 16 and which are slidably mounted on longitudinally extending rails 44. A hand wheel 46 is provided for moving the supports 42 into selected longitudinal positions along rails 44 for purposes hereinafter described. A cross bar 48 extends between the upper ends of the supports 42 and carries a fluid actuated piston-cylinder arrangement 50. The piston rod 52 extends from the piston-cylinder 50 through cross bar 48 and carries at its lower end a blade 54. The blade 54 has a shallow U-shaped configuration with a base 56 and side flanges 58. Lips 60 extend laterally from flanges 58 and engage in guide slots 62 formed along the inner faces of supports 42. It will be appreciated that the piston-cylinder 50 serves to lower and raise blade 54 into and out of the path of movement of the molds M along the conveyor section 16.

On each of the inlet ends of the movable conveyor sections 18 and inset from the ends of rails 24, there is provided a gate, generally indicated 80, similar in construction to the gate 40 previously described. Particularly, gate 80 includes a pair of supports 78 secured at their lower ends to the conveyor surface 22 and mounting at their upper ends a cross-beam 64. A fluid actuated piston-cylinder 66 is mounted on cross-beam 64 and its piston rod 68 extends through cross-beam 64 for connection with a blade 70. Blade 70 is identically configured as blade 54 and has a base 72, side flanges 74 and laterally extending lips 76. Lips 76 engage in guide slots formed along the inner faces of supports 78. Consequently, blade 70 is mounted for vertical reciprocable movement relative to the conveyor surface 22 into and out of horizontal registry with the molds on conveyor surface 22.

In use, a selected one of the moving conveyor sections 18 is displaced along rails 34 for alignment with the molds being conveyed along the pouring station 12 and fixed conveyor section 16. As the molds are pushed out from the mold forming machine, poured and conveyed therealong, the molds M are successively discharged onto the moving conveyor section 18. Particularly, rails 24 interfit with rails 20 and hence provide a smooth transition for the molds when advances from conveyor section 16 to conveyor section 18. When a mold is pushed onto the conveyor surface 22, surface 22 is displaced on rollers 28 in a downstream direction a distance approximately equal to the length of an individual mold. A suitable valve, not shown, shifts upon extension of cylinder 30 to permit free retraction of its piston when section 18 is displaced in a downstream direction. Prior to the next mold being pushed out from the mold forming machine, the cylinder 30 is actuated to slide the rails 24 in an upstream direction a distance equal to one mold length. The mold on the conveyor surface 22 remains stationary while the rails 24 slide relative thereto. Upon receiving the next mold, the conveyor surface again rolls on rollers 28 in a downstream direction a distance equal to one mold length. The cycle is repeated until the conveyor section is filled with molds. It will be appreciated that the molds on the fixed conveyor section 16 are stationary as the rails 24 telescope in an upstream direction to prepare for the next pushout cycle.

When the moving conveyor section 18 is filled with molds and it is desired to continue casting and to move the molds on section 18 aside to provide the required residence time for cooling purposes, a retainer plate, not shown, is disposed against the lead mold of section 18. The gate 40 is then moved longitudinally such that the blade 54 overlies the interface between a pair of molds having an unpoured cavity at their interface. It will be appreciated that the length of moving conveyor section 18 is known and hence a cavity spaced back from the discharge end of the fixed conveyor a like distance can be selected and not poured such that when the empty cavity reaches the discharge end of the fixed conveyor, the movable conveyor section is substantially filled with poured molds. Once the blade 54 is positioned over this unpoured cavity at the mold interface, the movable section 18 is displaced forwardly on rollers 28 such that its gate and blade 70 are aligned with the gate 40 and blade 54. The blades 54 and 70 engage one another in close-fitting relation. The blades are then simultaneously actuated to shear through the empty mold cavity. The blade 54 on the fixed conveyor section 16 and the blade 70 and retainer plate on the movable conveyor section 18 maintain the molds on the respective sections in engaged face-to-face relation, thus maintaining casting integrity. The blades also keep the molds from falling off the conveyor when the line is separated. Once the blades have sheared through the empty mold cavity, the movable conveyor section 18 is retracted longitudinally away from the fixed conveyor section 16 and then moved laterally along rails 34 to a mold cooling storage area prior to breaking the castings from the molds. Thus, a plurality of mold sections can be selectively poured and set aside from the molding line for the required residence time for cooling purposes. Once cooled, the molds on the movable conveyor sections are pushed out onto a shakeout conveyor, not shown, or realigned with the fixed sections 16 such that the molds are pushed out onto the shakeout conveyor as the pushout discharges successive molds onto the fixed conveyor 16.

An empty conveyor section 18 is then moved along rails 34 into longitudinal alignment with fixed conveyor 16. The cylinder 30 of that section 18 is actuated to interfit the rails 24 with rails 20 and blade 54 is then lifted. Successive mold pushouts from the molding machine cause successive molds to be discharged on the unfilled movable conveyor section 18 and it is filled in the manner previously described.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A conveyor for a flaskless mold line having a series of molds engaged in face-to-face butting relation comprising first and second elongated conveyor sections disposed in end-to-end relation and forming a support for the molds of the mold line, means carried by at least one of said sections and adjacent the juncture of said first and second sections for separating the mold line and forming a pair of discrete mold lines on said first and second sections respectively, said separating means including a blade selectively movable into a first position engageable between a pair of adjacent molds at their interface and a second position spaced from the mold line, means for displacing the discrete mold line on one of said sections away from the other of said sections in a direction generally parallel to the direction in which said one section extends from the other mold section.

2. A conveyor according to claim 1 wherein said separating means includes a frame carried by said one section and mounting said blade, and means mounting said frame for longitudinal movement relative to said one section for aligning said blade with a selected mold interface.

3. A conveyor according to claim 1 wherein said separating means includes a second blade selectively movable into a first position engageable between a pair of adjacent molds at their interface and a second position spaced from the mold line, said first mentioned blade and said second blade being carried by said first and second sections respectively and adjacent the juncture of said sections, said blades being engageable one with the other in back-to-back relation, said first and second blades in said first positions thereof serving to retain the respective molds on said first and second sections in face-to-face butting relation when said sections are separated one from the other.

4. A conveyor according to claim 3 wherein said separating means includes first and second frames adjacent the juncture of said first and second sections respectively, means carried by said first and second frames for respectively mounting said first and second blades for vertical movement between said first and second positions thereof, and means for moving said first and second blades between said first and second positions.

5. A conveyor according to claim 1 wherein said second conveyor section is adapted to receive molds from said first section, said second section including means for carrying the molds thereon for translatory movement in a longitudinal direction away from said first section and without sliding movement of such molds relative to said second section, and means for moving said second section in an opposite longitudinal direction with a force sufficient to overcome the frictional forces between the molds on said second section and said second section whereby the molds are not moved in said second direction.

6. A conveyor according to claim 1 including a third conveyor section, means mounting said second and third conveyor sections for movement into and out of longitudinal registry with said first conveyor section, said first mentioned blade being carried by said first section, second and third blades carried by said second and third sections respectively, each of said second and third blades being selectively movable into a first position engageable between a pair of adjacent molds at their interface and a second position spaced from the mold line when the respective one of said second and third section lies in registry with said first section, said first and second blades being engageable one with the other in back-to-back relation when said first and second sections register one with the other, said first and third blades being engageable one with the other in back-to-back relation when said first and third sections register one with the other.

* * * * *